United States Patent
Kobayashi

(10) Patent No.: US 6,813,083 B2
(45) Date of Patent: Nov. 2, 2004

(54) DEVICE FOR REPRODUCING THREE-DIMENSIONAL IMAGE WITH BACKGROUND

(75) Inventor: Tetsuro Kobayashi, Hyogo (JP)

(73) Assignee: Japan Science and Technology Corporation, Kawaguchi (JP)

(*) Notice: Subject to any disclaimer, the term of this patent is extended or adjusted under 35 U.S.C. 154(b) by 0 days.

(21) Appl. No.: 10/204,309

(22) PCT Filed: Feb. 14, 2001

(86) PCT No.: PCT/JP01/01008
§ 371 (c)(1),
(2), (4) Date: Nov. 20, 2002

(87) PCT Pub. No.: WO01/63340
PCT Pub. Date: Aug. 30, 2001

(65) Prior Publication Data
US 2003/0151603 A1 Aug. 14, 2003

(30) Foreign Application Priority Data
Feb. 22, 2000 (JP) .......... 2000-43742

(51) Int. Cl.$^7$ .......... G02B 27/10; G02B 27/22; H04N 15/00; G06T 15/00; G09G 5/00
(52) U.S. Cl. .......... 359/619; 359/618; 359/462; 359/464; 359/465; 359/466; 348/51; 348/54; 348/59; 345/419; 345/6; 345/7
(58) Field of Search .......... 359/618, 619, 359/626, 634, 462, 464, 465, 466, 463, 475; 345/6, 7, 419; 348/42, 46, 51, 54, 57, 58, 59

(56) References Cited
U.S. PATENT DOCUMENTS 6,172,807 B1 * 1/2001 Akamatsu .......... 359/462
6,178,043 B1 * 1/2001 Son et al. .......... 359/462
6,204,967 B1 * 3/2001 Morishima et al. .......... 359/462
6,224,214 B1 * 5/2001 Martin et al. .......... 353/7
6,252,707 B1 * 6/2001 Kleinberger et al. .......... 359/465
6,259,450 B1 * 7/2001 Chiabrera et al. .......... 345/419
6,307,585 B1 * 10/2001 Hentschke .......... 348/51
6,603,442 B1 * 8/2003 Hong .......... 345/7

FOREIGN PATENT DOCUMENTS

| JP | 7-311371 | 11/1995 |
| JP | 10-26740 | 1/1998 |
| JP | 10-239785 | 9/1998 |

* cited by examiner

Primary Examiner—Loha Ben
(74) Attorney, Agent, or Firm—Oblon, Spivak, McClelland, Maier & Neustadt, P.C.

(57) ABSTRACT

A device for reproducing a three-dimensional image with a background, which device reproduces a three-dimensional image standing out from a background picture. The device includes a white-color point light source array and a color transmission spatial distribution filter having a function of specially weighting intensity and color of light. These components reproduce a three-dimensional image by generating a group of light rays which can be seen as if a three-dimensional color object standing out from the background picture is actually present. Color and/or intensity weights are imparted to the color transmission spatial distribution filter, except for a transmission portion thereof, such that the background picture of the three-dimensional image can be seen at the vicinity of the white-color point light source array or the color transmission spatial distribution filter. The device can be applied to standing-out displays, standing-out signboards, and wall-mounted show windows.

4 Claims, 5 Drawing Sheets

A

DEVICE FOR REPRODUCING THREE-DIMENSIONAL IMAGE WITH BACKGROUND

TECHNICAL FIELD

The present invention relates to a device for reproducing a three-dimensional image with a background by use of an optical filter, which device can be used in the fields of image technology, broadcasting technology, the arts, the multimedia industry, cameras, and photographs.

BACKGROUND ART

Conventional techniques for recording and reproducing three-dimensional images are generally classified into two schemes; i.e., a scheme in which a three-dimensional image is recorded by some method, and the recorded image is reproduced for direct observation by an observer; and a stereoscope scheme in which, instead of a three-dimensional image, a two-dimensional image for the right eye and a two-dimensional image for the left eye are recorded, and the recorded images are reproduced such that an observer can see the image for the right eye through his right eye and the image for the left eye through his left eye.

Typical examples of the former are holograms and integral photography; and typical examples of the latter include three-dimensional movies to be observed by use of polarization glasses, and three-dimensional televisions utilizing a lenticular sheet.

In the latter case, although an image can be observed three-dimensionally, a three-dimensional image is not reproduced, and therefore that the image does not change even when the observation position is changed, and the back side of the image cannot be seen. Therefore, the latter scheme provides pseudo-production of three-dimensional images.

In holography, which is an ideal method of recording and reproducing three-dimensional images (hereinafter referred to as 3D images), data regarding the wave front of light emitted from an object are used in order to record three-dimensional image data. Wave front data are recorded in such a manner that scattered light from an object and separately provided reference light are caused to interfere with each other to thereby form interference fringes, and the thus-formed interference fringes are recorded. Therefore, an optical system and a recording medium to be used must have a spatial resolution close to the wavelength of light, and a coherent light source such as a laser must be used at least for recording. Since interference fringes depend on wavelength, handling of color images; i.e., recording of color images, requires three lasers, for the three primary colors, and a complex configuration.

Because of the above factors, full-color holography for large screen involves considerably high cost; therefore, holography is not used for real-time display of 3D images and three-dimensional movies, although holography is presently used for mediums for recording digital data, as well as for credit cards and ornaments, in which holography can be implemented in a small scale.

Integral photography is the same as a stereoscope in the point that a three-dimensional image is obtained by means of parallax. However, whereas a stereoscope is designed to enable a user to observe images of two angles of view through respective eyes and to attain solidity from binocular parallax, in the case of integral photography, an image is observed from many angles of view in order to record images of different view angles, and the images are reproduced simultaneously in order to provide an image which changes depending on viewing position.

Therefore, such integral photography has advantages in that an image changes upon movement of the eyes and that glasses are unnecessary. Moreover, integral photography has other many advantages, which cannot be attained by use of a holograph; e.g., recording and reproduction can be effected by use of ordinary light, and a background of infinite distance can be reproduced. However, in the case of integral photography, images of all angles of view are imaged at a certain position simultaneously (of course, only portions of the images can be observed from a specific direction). When a user focuses his/her eyes on that position, the user can see the images as being located at different positions. Therefore, the focus position does not coincide with a position of a viewed image, inevitably leading to the problem of unnaturalness (e.g., even when an image can be seen to be located directly in front of a user, the user's eyes are focused on a more remote position).

Images viewed from many different angles of view can be recorded with ease by use of a micro lens array; however, when the thus-recorded images are reproduced in a reverse sequence, a user sees, from the back side, an image to be viewed from the front side (for example, when an image of a face is reproduced, the face can be seen, but the nose can been seen as being depressed). Therefore, integral photography has many drawbacks, including great labor such as cumbersome operation of reversing the image.

Meanwhile, stereoscope-type devices are often used at an exposition or a like place, and a user can enjoy stereoscopic images to some degree; however, such a stereoscope-type device, when considered as a no-glass-type device, has many imperfect portions. In addition, since pseudo-reproduction is effected after all, the stereoscopic images lack realism. Moreover, like integral photography, the stereoscope-type devices have a drawback in that a focus position does not coincide with a position of a viewed image.

As described above, no 3D image recording/reproduction device or system which is sufficiently practical exists at present, and therefore, proposal of a practical 3D image recording/reproduction device or system has been pursued.

Recording and reproduction of 3D images, in particular, motion pictures, which are the most important image information medium, are useful in many fields related to information, broadcasting, movies, and entertainment, and will become a large industry in future. Therefore, research on the recording and reproduction of 3D images has been carried out in many companies, universities, private research institutes, and public research institutes, both in Japan and overseas. However, no satisfactory device has yet been developed.

In order to break with the status quo, the present inventor has proposed a "light ray reproduction method" in which a group of images of multiple viewpoints is projected by use of an array of point light sources in order to artificially generate a group of light rays corresponding to light scattered from an object, to thereby generate a 3D image (Japanese Patent Application Laid-Open (kokai) No. 10-239785). Moreover, the present inventor has proposed a "three-dimensional image reproduction device using a filter" which has improved resolution (Japanese Patent Application Laid-Open (kokai) No. 11-232178). The proposed method and device resemble integral photography (hereinafter referred to as "IP") in the point that a group of images of multiple viewpoints is used. However, the proposed method and device differ from IP in that the proposed method and device reproduce 3D images having depth and do not utilize parallax, or are rather similar to holography (when an image is photographed by use of a camera, the image is blurred except for the focused portion). The proposed method and device have succeeded in generating mostly satisfactory 3D images of simple objects.

Next, a technique which serves as the basis of the present invention will be described in detail.

FIG. 2 is a schematic view showing the principle of three-dimensional vision.

In FIG. 2, two points P and Q represent objects to be observed, and differ from each other in direction and distance. An observer 101 can detect the directions of the objects from the direction of light rays traveling toward the observer 101 and their distances from the parallax angles of the respective eyes through which the observer 101 views the point objects. Although FIG. 2 shows a finite number of light rays, in actuality, an infinite number of light rays are present. If such light rays can be generated, the observer 101 can view the two points three-dimensionally, even when the two points P and Q are not actually present.

In the above-described light ray reproduction method, such light rays are generated artificially in order to enable observation of a three-dimensional image. FIG. 3 shows a basic structure of a device used in the light ray reproduction method.

In FIG. 3, reference numeral 101 denotes an observer; 102 denotes an array of white-color point light sources; 103 denotes an image filter (for generation of light rays) on which images of multiple viewpoints are recorded; and 104 denotes a lens.

Since reproduction of an infinite number of light rays is impossible, as shown in FIG. 3, only light rays which pass through the white-color point light source array 102 distributed two-dimensionally are reproduced. Transmission (passage) points corresponding to point light sources of the white-color point light source array 102 are provided on the image filter 103, which is disposed to face the white-color point light source array 102; and the transmission (passage) points each have a color filter function for selecting a specific color from light emitted from the corresponding white-color point light source. In such a case, there can be reproduced colored light rays, each traveling along a straight line connecting a point light source and a corresponding passage point. When these light rays are focused on a single point P' by means of the lens 104, the light rays are observed by the observer 101 as if they were emitted from the point P', so that the point P' can be seen three-dimensionally.

A three-dimensional object is a set of points. Therefore, when proper transmission images of multiple viewpoints rather than dots are recorded on the image filter 103, the above-described configuration enables reproduction of a three-dimensional object.

Moreover, when a lens 104' and another point object P are assumed as indicated by a dotted line in FIG. 3, the light rays passing through P' can be considered reproduction of light rays emitted from P. The observer can be considered to view the object P', or the observer can be considered to view a real image of the object P via the lenses 104' and 104.

FIG. 4 shows an example of 3D object reproduction rather than point reproduction.

In FIG. 4, reference numeral 111 denotes a white-color light source; 112 denotes a pin-hole array; 113 denotes a color filter; 114 denotes a lens; 115 denotes an object to be observed; and 116 denotes an observer.

In FIG. 4, the function of the point light source array is realized through combined use of the white-color light source 111, a scatter plate (such as frosted glass), and the pin-hole array 112.

Here, the case in which the object 115 is present in front of the observer 116 will be considered. When light rays emitted from the point light sources of the array 102 shown in FIG. 3 or passed through the pin-holes of the pin-hole array 112 shown in FIG. 4 are passed through the color filter 113 for light ray reproduction and focused on the object 115 by means of the lens 114, the observer 116 observes the light rays as if they were emitted from the object 115. As a result, the object 115 can be seen three-dimensionally. In the case where the observer views an image generated by means of the lens 104 as shown in FIG. 3, two-dimensional images obtained upon observation of the object 115 from a specific point light source are recorded on a portion of the filter that faces the specific point light source, which is basically the same as recorded images in the case of integral photography (however, unlike the case of integral photography, images are not reversed in the course of reproduction).

In this case, when a micro lens is disposed at the point light source section or the pin-hole section and an actual object is photographed so as to form a positive image on the surface of a filter, the filter becomes a color filter. If resolution is not important, the pin-hole section is used as is in order to record pin-hole photographs, whereby loci of light rays are recorded as they are. In the case of CG or animation, images to be recorded are calculated and depicted by means of a computer without actual photographing.

The present inventor has succeeded in generating a color three-dimensional image by the above-described scheme.

However, the light ray reproduction method involves a big problem, in that the backstage such as a white-color point light source section and a filter section are exposed, leading to lack of realism.

DISCLOSURE OF THE INVENTION

The biggest problem involved in the above-described conventional devices is that not only a three-dimensional image generated upon reproduction of light rays, but also the backstage such as a filter and a white-color point light source array (pin-hole array) can be seen, because the depth of field of the human eye is deep, and scattering occurs at the filter section.

This may deteriorate the realism of a reproduced three-dimensional image. In addition, the conventional devices have a problem in that a group of light rays from the white-color point light source array or the pin-hole array cannot reproduce an image at the periphery of the filter section located in the vicinity thereof.

In the case of the conventional techniques, when a device is viewed from an observer side, not only a reproduced three-dimensional image, but also a white-color point light source array and a filter; i.e., the backstage, can be seen, thereby greatly deteriorating image quality.

The present inventor has attempted to use as a background a large portion of a filter (excepting for a portion for generating light rays for reproduction of a three-dimensional image); i.e., the backstage, in order to cover unnecessary scattered light by means of the background. An object of the present invention is to provide a device for reproducing a three-dimensional image with a background, which device can reproduce a very bright background image consisting of a large number of pixels and having a wide view angle, as well as a three-dimensional image standing out from the background or a three-dimensional image located behind the background image, at high S/N ratio, and which enables realization of so-called standing-out displays, standing-out signboards, and wall-mounted show windows.

In order to achieve the above object, the present invention provides the following.

[1] A device for reproducing a three-dimensional image with a background, characterized by comprising a white-color point light source array and a color transmission spatial distribution filter having a function of specially weighting intensity and color of light, wherein a group of light rays which can be seen as if the light rays were color light rays scattered from a three-dimensional color object is produced by use of light from the white-color point light source array and the color transmission spatial distribution filter; and color and/or intensity weights are imparted to the color transmission spatial distribution filter, except for a transmission portion used for reproduction of light rays of a three-dimensional object in such a manner that an image serving as a background of the three-dimensional object can be seen at the vicinity of the white-color point light source array or the filter.

[2] A device for reproducing a three-dimensional image with a background described in [1] above, characterized in that a single or a plurality of lenses are disposed between the color transmission spatial distribution filter and an observer.

[3] A device for reproducing a three-dimensional image with a background described in [1] or [2] above, characterized in that a white-color light source, a white-color scatter plate, and a pin-hole array are used in combination in place of the white-color point light source array.

As described in the above, the feature of the present invention resides in that a background image is provided on the filter and that the spatial filter has a portion which permits transmission of light (i.e., a portion to be used for reproduction of a three-dimensional image) and a portion which prevents transmission of light (i.e., a portion not to be used for reproduction of a three-dimensional image). This unused portion is colored and used as a background. From the viewpoint of overall configuration, the three-dimensional image reproduction device of the present invention consists of a white-color point light source array (or a pin-hole array, etc.) and a color transmission spatial distribution filter having a function of specially weighting intensity and color of light.

BEST MODE FOR CARRYING OUT THE INVENTION

Embodiments of the present invention will now be described in detail.

First, the basic structure of the present invention will be described.

Figure 5:
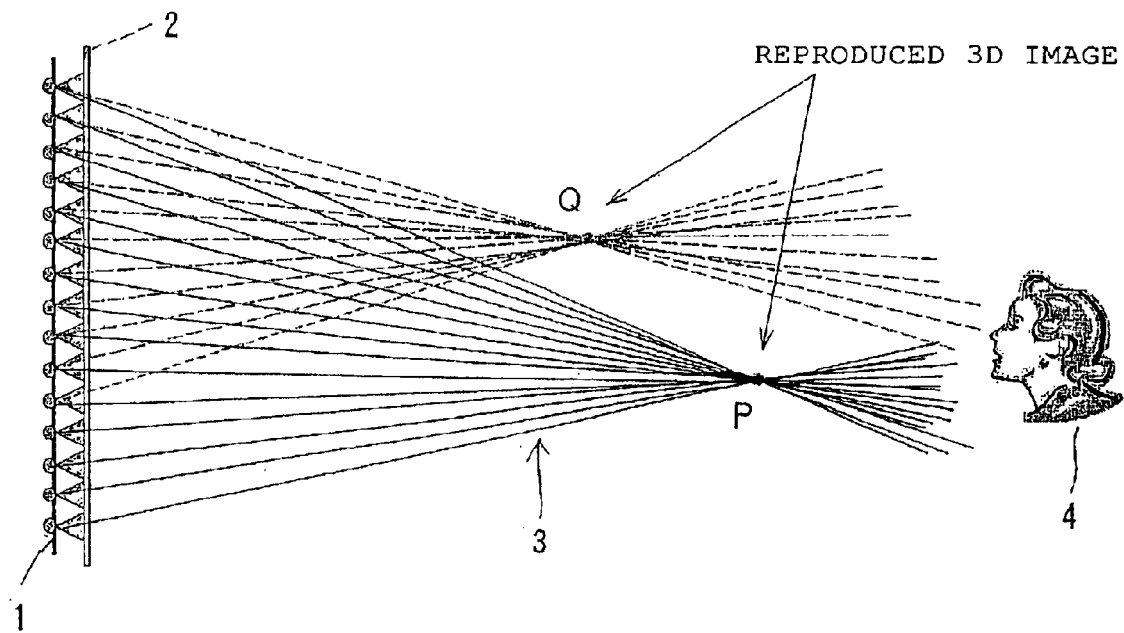
FIG. 5 is a view showing the basic structure of a device for reproducing a three-dimensional image with a background according to the present invention.

FIG. 5 is a view showing the basic structure of a device for reproducing a three-dimensional image with a background according to the present invention.

FIG. 5 shows the basic structure of the present invention for the case in which no lens is used.

In FIG. 5, a light-ray reproduction spatial filter 2, serving also as a background panel, converts light rays from a white-color point light source array 1 to a light ray group 3 for formation of a 3D image, while partially modulating intensity and partially coloring the light rays. Meanwhile, in portions of the background panel, excepting the portion used for light ray reproduction, light rays emitted from the white-color point light source array 1 are permitted to pass therethrough after being scattered or colored in order to form a background. Although the structure differs slightly from the conventional device, a light ray reproduction method is used in order to reproduce a 3D image. However, the device of the present invention differs from the conventional device in that the filter 2 displays the background.

Figure 6:
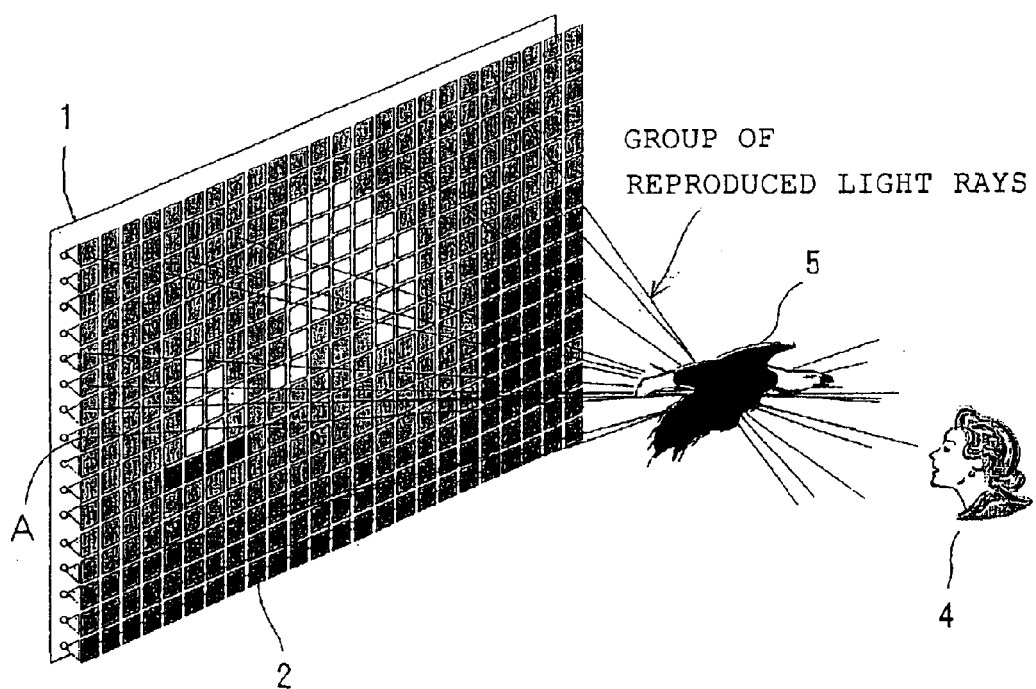
FIG. 6 is a schematic view of the three-dimensional image reproduction device according to an embodiment of the present invention.

FIG. 6 is a perspective view showing the structure of FIG. 5 for easier understanding.

In FIG. 6, reference numeral 5 denotes a reproduced three-dimensional image (3D image) (a bird in this example). The remaining portions are the same as those in FIG. 5; therefore these portions are denoted by the same reference numerals, and their descriptions are omitted.

Figure 7:
FIG. 7 is an illustration showing one example element of the filter of the three-dimensional image reproduction device of FIG. 6.

As shown in FIG. 7, in each grid of the filter 2, a colored transmission image (a bird in this example) is depicted in order to produce light rays for generation of a 3D image. The remaining portion serves as a portion of the background. Since a portion of the background corresponding to the bird is located behind the bird, that portion is not observed as the background.

A single grid (element) of the filter 2 faces a single point light source, and a transmission filter pattern for producing light rays for reproduction of a three-dimensional object image is depicted there. The portion other than the transmission portion is colored so as to provide a single pixel (several pixels in some cases) of the background. The background portion may be of a transmission type or a transmission/scatter type. In the case in which the background portion is of the transmission/scatter type, a single grid serves to provide a large number of pixels of the background, whereby the background can be displayed with considerably high quality. FIG. 6 shows an example case in which a single grid provides a single pixel of the background.

Here, specific numerical data are provided. The outer dimensions of the light-ray reproduction spatial filter 2, serving as a background panel as well, are 1.6 m×1.2 m; point light sources are disposed at intervals of 5.0 mm in an array of 320×240; and each grid assumes a square shape of 5.0 mm×5.0 mm. When an image is depicted on the filter by use of a color printer of about 600 dpi, reproduction of light rays of about 100×100 per grid becomes possible. When all the light rays are used for a standing-out object, the standing-out object becomes excessively large, so that the background is hidden behind the object. Therefore, in actuality, satisfactory display can be attained through reproduction of a very small number of light rays.

Figure 8:
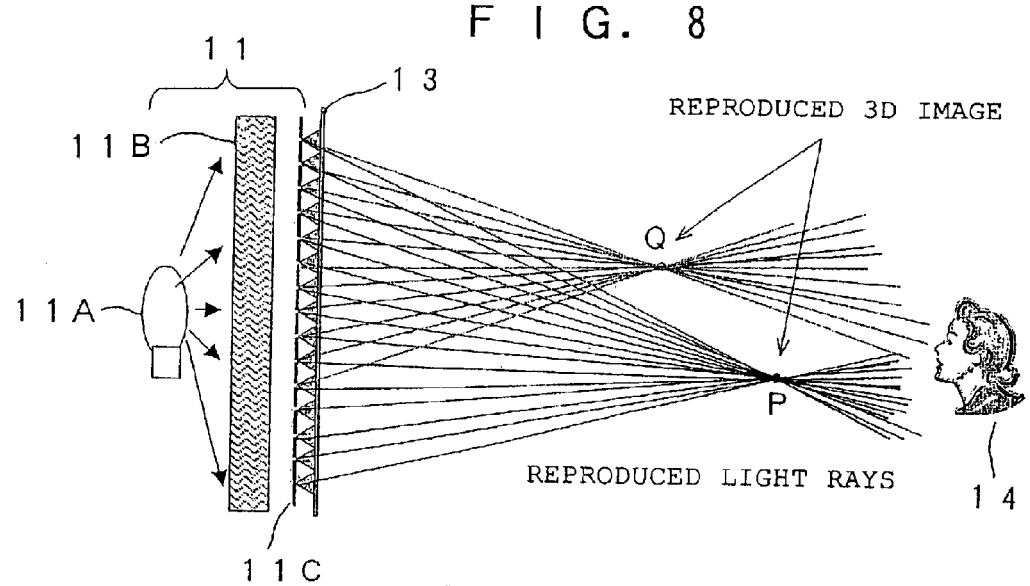
FIG. 8 is a schematic view of a three-dimensional image reproduction device according to another embodiment of the present invention.

FIG. 8 shows an example structure in which the white-color point light source array is replaced by a white-color light source, a white-color scatter plate, and a pin-hole array.

In FIG. 8, reference numeral 11 denotes a white-color point light source array consisting of a white-color light source 11A, a white-color scatter plate 11B, and a pin-hole array 11C; 13 denotes a light-ray reproduction spatial filter, serving as a background panel as well; 14 denotes an observer; and reference letters Q and P each denote a reproduced three-dimensional image.

Figure 9:
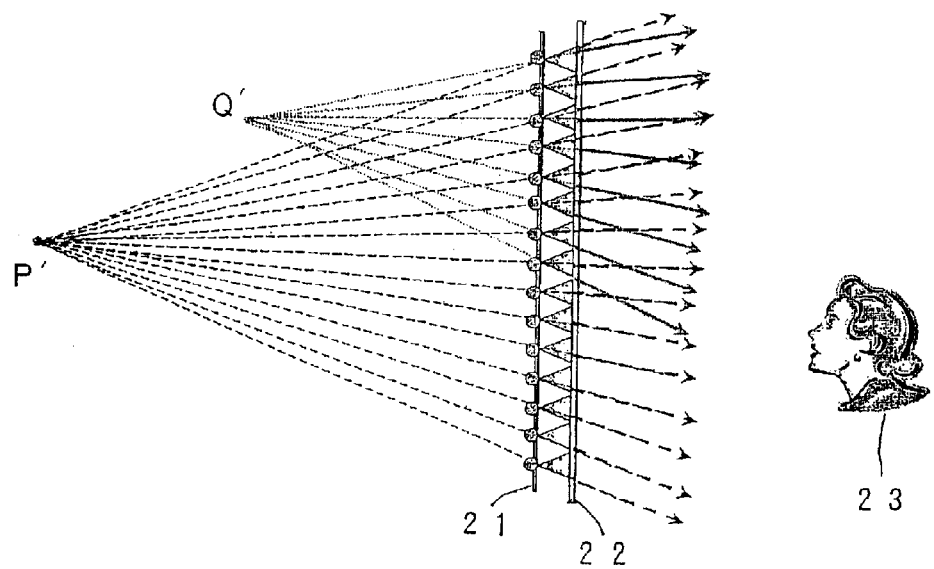
FIG. 9 is a schematic view of a three-dimensional image reproduction device (foreground type) according to another embodiment of the present invention.

FIG. 9 is an explanatory view showing a case in which a three-dimensional image can be seen deeper than the foreground.

In FIG. 9, reference numeral 21 denotes a white-color point light source array; 22 denotes a spatial filter for producing light rays for generation of the rear three-dimensional image and serving as a foreground display panel as well; 23 denotes an observer; and reference letters P' and Q' each denote a reproduced three-dimensional image.

This device can be used, for example, for wall-mounted show windows.

Figure 10:
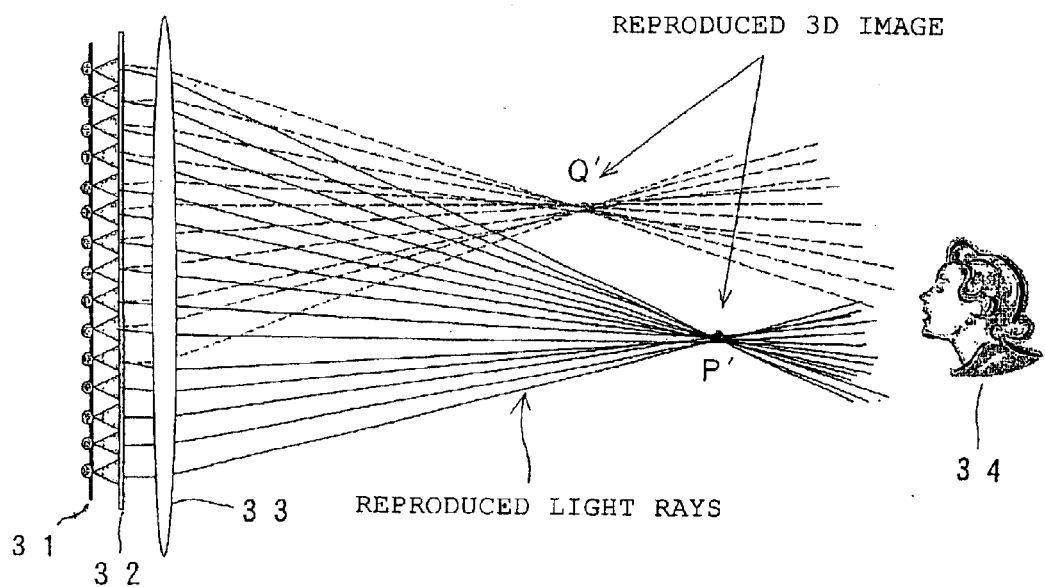
FIG. 10 is a schematic view of a three-dimensional image reproduction device (lens type) according to another embodiment of the present invention.

FIG. 10 shows an example structure in which a lens is used.

In FIG. 10, reference numeral 31 denotes a white-color point light source array; 32 denotes a light-ray reproduction spatial filter, serving as a background panel as well; 33 denotes a lens; 34 denotes an observer; and reference letters P' and Q' each denote a reproduced three-dimensional image. In this structure, the background is displayed in the form of a virtual image at a more remote position, whereby three-dimensional images can be displayed in various fashions.

Figure 11:
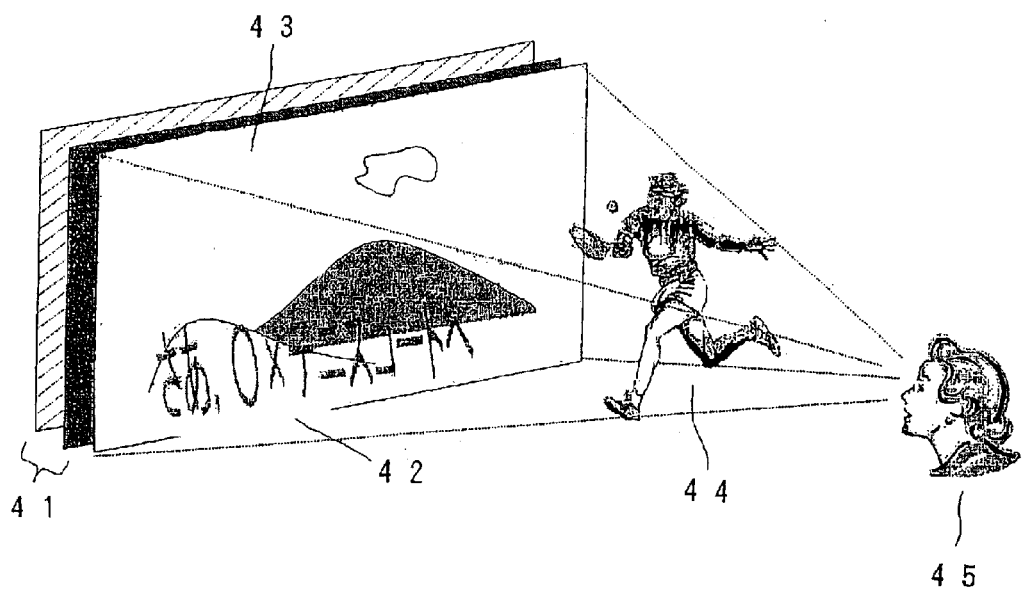
FIG. 11 is a view showing an example case in which the three-dimensional image reproduction device according to the embodiment of the present invention is used in a standing-out signboard for advertisement.

FIG. 11 is a view showing an example case in which the three-dimensional image reproduction device according to the embodiment of the present invention is used in a standing-out signboard for advertisement.

In FIG. 11, reference numeral 41 denotes a white-color point light source array; 42 denotes a light-ray reproduction spatial filter, serving as a background panel as well; 43 denotes a background; 44 denotes a reproduced 3D image (reproduced three-dimensional image); and 45 denotes an observer.

(Specific Actions of the Embodiments and Effects Peculiar thereto)

The principle of reproduction of a 3D image is the same as that of the light ray reproduction method; that is, a combination of a point light source and a transmission point on the light ray reproduction filter reproduces a light ray which passes through the two points, and the light ray is colored in accordance with the color at the transmission point. Thus, the entire array of white-color point light sources produces a group of light rays. When the positions of the transmission points are determined in such a manner that the group of light rays converge at a specific spatial point and then diverge therefrom, an object is reproduced to be located at the spatial point. Since an image of a 3D object is a set of point images, when a large number of transmission points for these images are distributed over the filter, a 3D image is formed by a produced group of light rays and is observed by an observer. This is the principle of generation of a 3D image by the light ray reproduction method. Incidentally, the lens of the human eye has a short focus; therefore, even when an observer focuses his/her eyes on a formed 3D image, the observer can see well the filter located behind the image. In other words, the mechanism of the 3D image reproduction system can be seen from the outside. However, in the present invention, a background image is depicted over the entirety of the filter, and each pixel thereof extends two-dimensionally. Therefore, transmission light from the filter diverges within a wide view angle (in the case in which the background portion is of the transmission type).

In the case of a transmission/scatter type, even when each pixel of the background is small, transmission light scatters within a wide range. In either case, the observer can see the background image within a wide range (as in the case of an ordinary screen). As a result, the backstage, which is desired not to be viewed, can be used as something that is valuable to see.

Since the light ray reproduction method and the device for reproducing a three-dimensional image with a background according to the present invention resemble conventional integral photography in many points, differences therebetween will be made clear.

Figure 1:
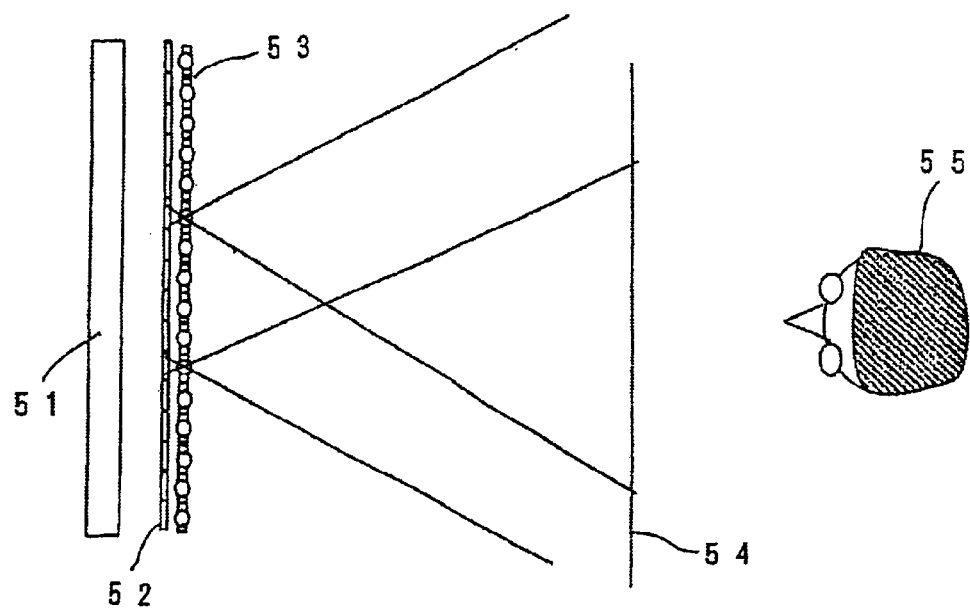
FIG. 1 is a diagram showing the principle of conventional integral photography.
Figure 2:
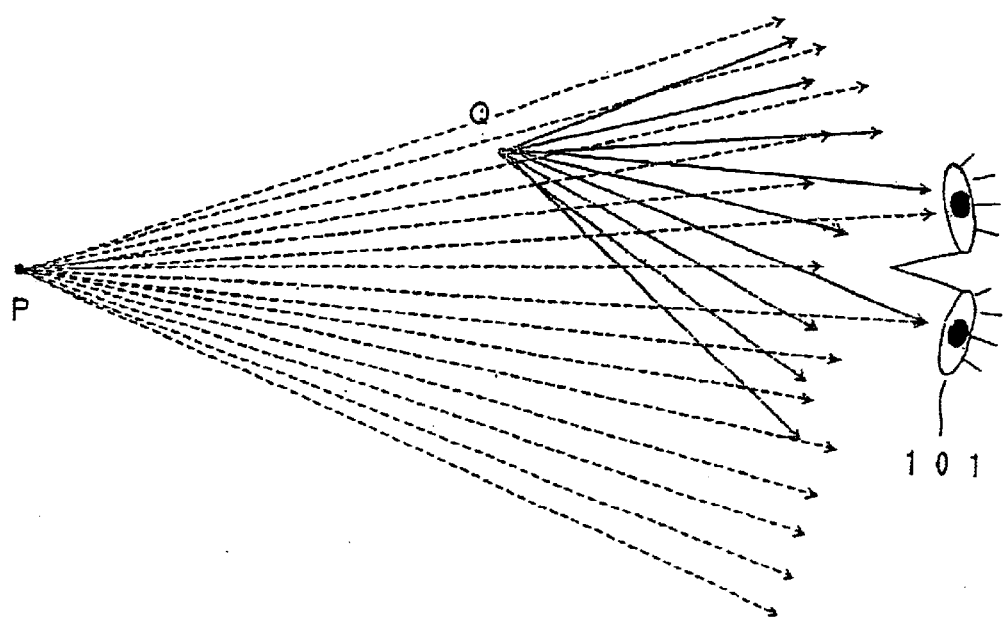
FIG. 2 is a schematic diagram showing the principle of three-dimensional vision.

FIG. 1 is a diagram showing the principle of conventional integral photography. In FIG. 1, reference numeral 51 denotes a white-color back light; 52 denotes a plate carrying images of multiple viewpoints depicted thereon; 53 denotes a micro lens array; 54 denotes an image plane; and 55 denotes an observer.

Figure 3:
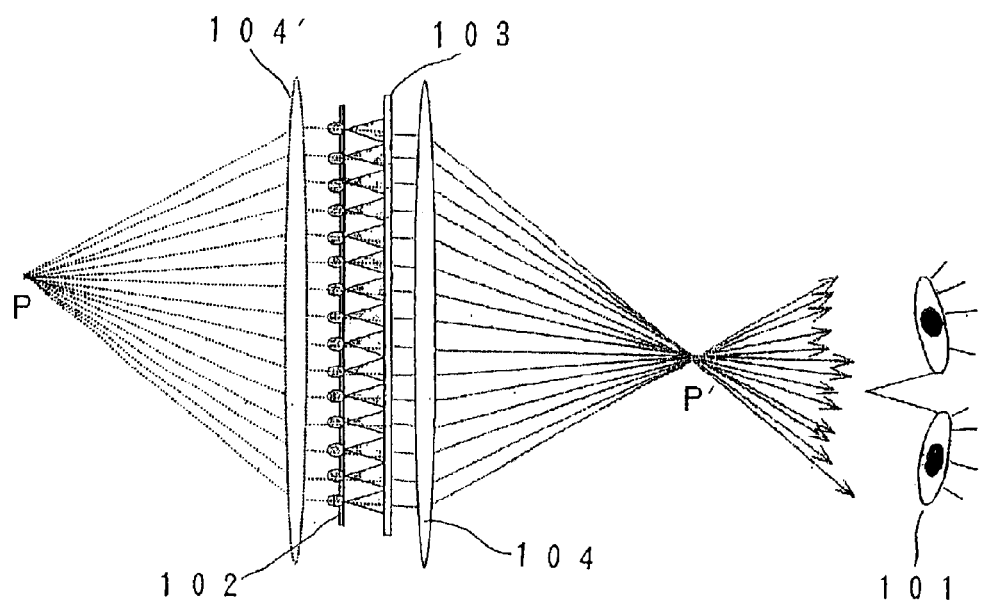
FIG. 3 is a diagram showing the principle of a light ray reproduction method.
Figure 4:
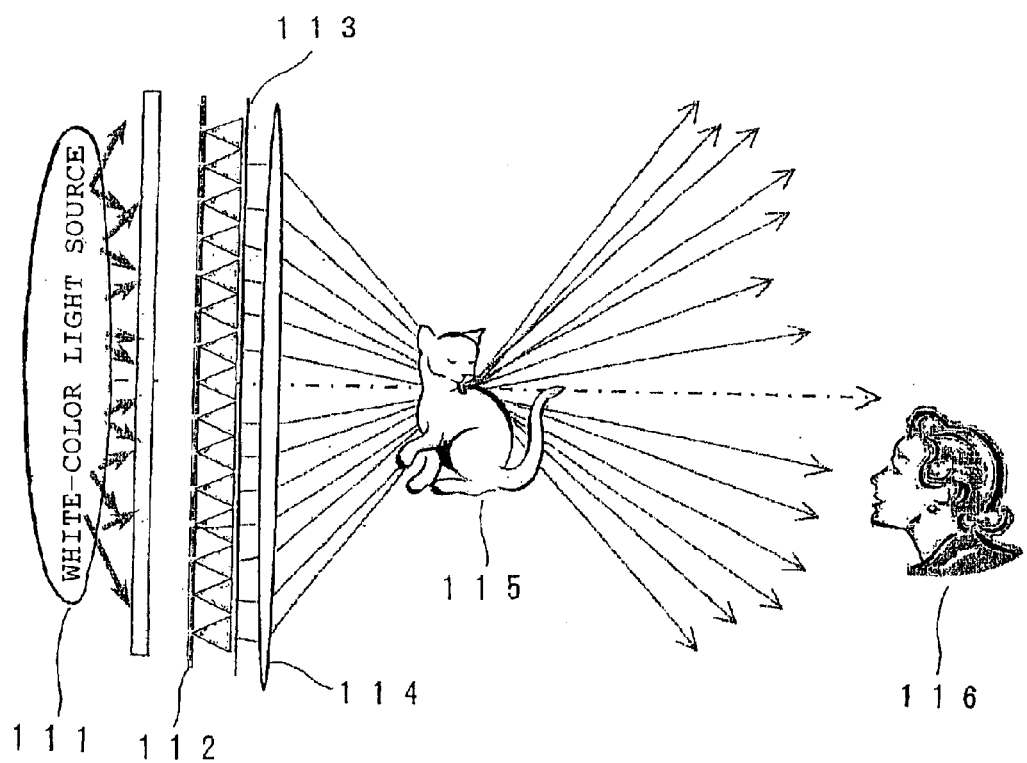
FIG. 4 is an example three-dimensional image observation performed by the light ray reproduction method and by use of a lens.

As shown in the basic structure (FIG. 5) of the present invention, light rays for reproduction of a 3D image are produced by use of a shadow picture (silhouette) on the filter formed by means of the white-color point light sources. Therefore, theoretically, no lens or pin-hole plate is required to be disposed between the filter and the observer. In actuality, FIGS. 5 and 6 do not contain any lens or pin hole. In the conventional light ray reproduction method as well (FIG. 3), the lens 104 is not essential and may be removed. Further, since a picture is a shadow picture, it is not reversed. Since imaging by means of an optical system such as a lens system is not used, a 3D image can be formed either frontward of the filter or backward of the filter.

By contrast, as shown in FIG. 1, in the case of integral photography, an imaging optical system such as the micro lens array 53 must be disposed between a portion which corresponds to the filter and which carries images of multiple viewpoints depicted thereon and the observer 55. Thus, the depicted images of multiple viewpoints are imaged in a superposed and reversed manner on a specific common plane located between the micro lens array 53 and the observer 55, and the observer 55 views the thus-formed image. Although the image changes with the view angle, the eyes are focused on the specific plane.

In other words, although no screen is used, the light ray reproduction method and the present invention are applications of shadow pictures, whereas integral photography is an application of a slide projector. Therefore, the light ray reproduction method and the present invention and integral photography are similar in appearance but quite different in nature.

The present invention is not limited to the above-described embodiments. Numerous modifications and variations of the present invention are possible in light of the spirit of the present invention, and they are not excluded from the scope of the present invention.

As having been described in detail, in the present invention, a large portion of a filter (excepting for a portion for generating light rays for reproduction of a three-dimensional image); i.e., the backstage, is used as a background in order to cover unnecessary scattered light by means of the background, to thereby reproduce a very bright background image consisting of a large number of pixels and having a wide view angle, as well as a three-dimensional image standing out from the background or a three-dimensional image located behind the background image, at high S/N ratio, whereby so-called standing-out displays, standing-out signboards, and wall-mounted show windows can be realized.

INDUSTRIAL APPLICABILITY

The reproduction device of the present invention is preferably used as a device for reproducing a three-dimensional image with a background by use of an optical filter, which device can be used in the fields of image technology, broadcasting technology, the arts, the multimedia industry, cameras, and photographs. Moreover, the reproduction device of the present invention can be applied to standing-out displays, standing-out signboards, and wall-mounted show windows.

What is claimed is:

1. A device for reproducing a three-dimensional image with a background, comprising:

a white-color point light source array; and a color transmission spatial distribution filter having a function of specially weighting intensity and color of light, wherein a group of light rays which can be seen as if the light rays were color light rays scattered from a three-dimensional color object is produced by use of light from the white-color point light source array and the color transmission spatial distribution filter; and color and/or intensity weights are imparted to the color transmission spatial distribution filter, except for a transmission portion used for reproduction of light rays of a three-dimensional object such that an image serving as a background of the three-dimensional object can be seen at the vicinity of the white-color point light source array or the filter.

2. A device for reproducing a three-dimensional image with a background according to claim 1, wherein a single or a plurality of lenses are disposed between the color transmission spatial distribution filter and an observer.

3. A device for reproducing a three-dimensional image with a background according to claim 2, wherein a white-color light source, a white-color scatter plate, and a pin-hole array are used in combination in place of the white color point light source array.

4. A device for reproducing a three-dimensional image with a background according to claim 1, wherein a white-color light source, a white-color scatter plate, and a pin-hole array are used in combination in place of the white color point light source array.

* * * * *